Dec. 3, 1935.                J. A. WATSON, JR                2,023,184
                                 DUMP TRUCK
                     Filed Aug. 11, 1932        2 Sheets-Sheet 2
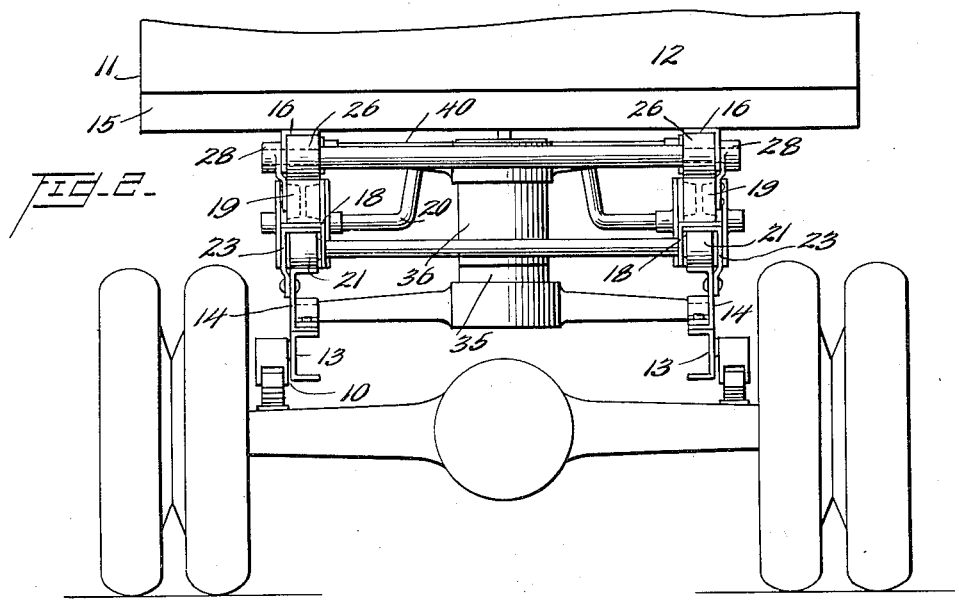
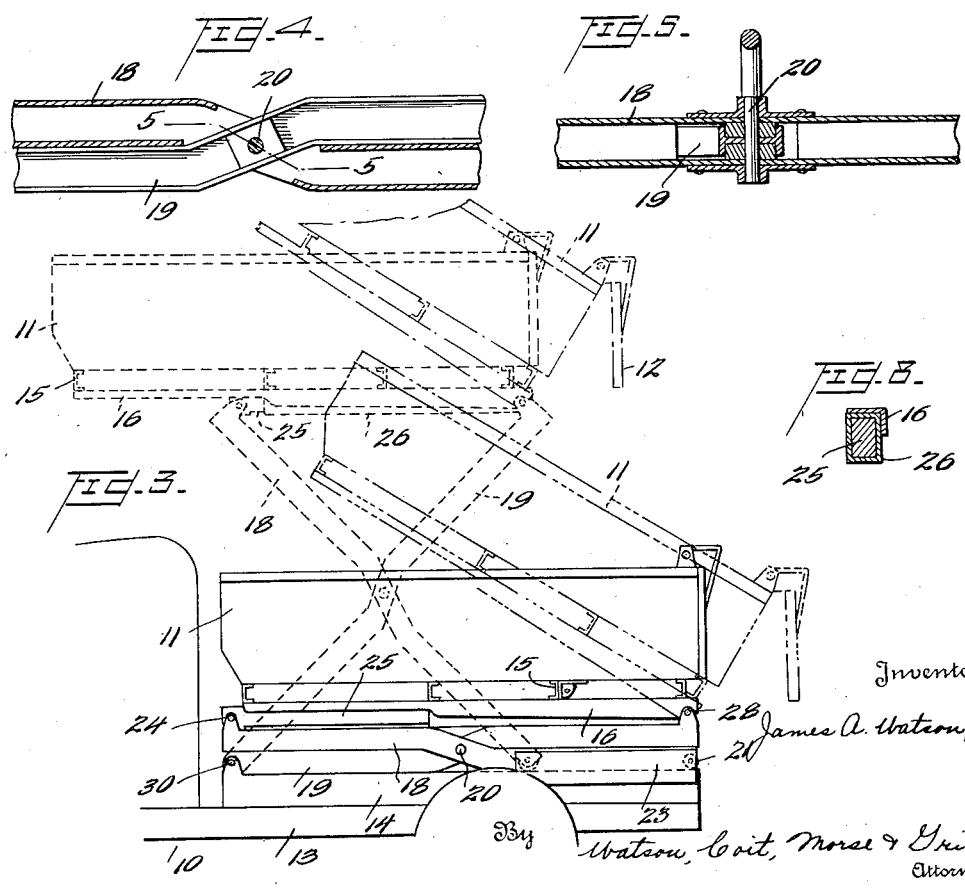

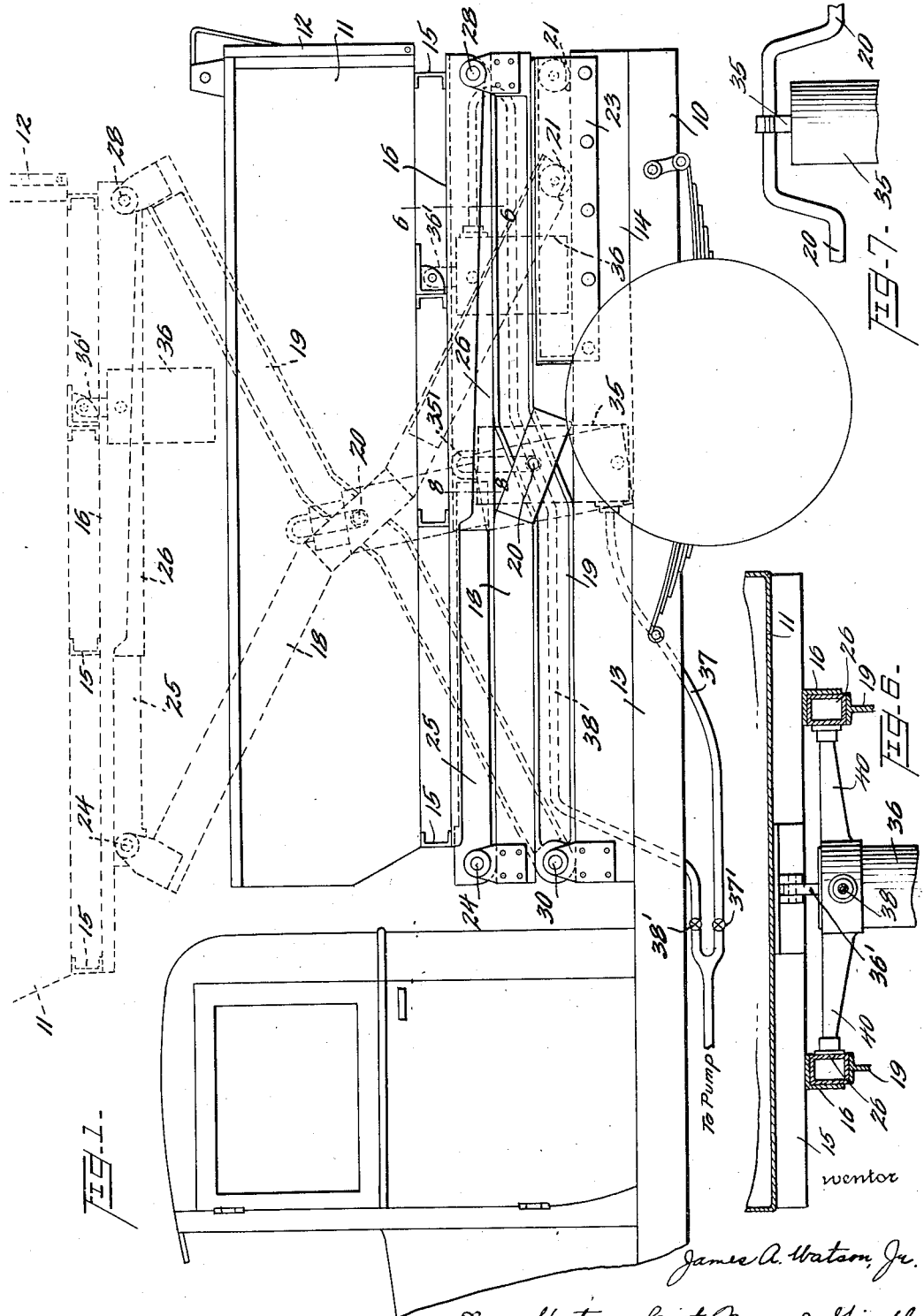

Patented Dec. 3, 1935

2,023,184

UNITED STATES PATENT OFFICE 2,023,184

DUMP TRUCK

James A. Watson, Jr., Silver Spring, Md.

Application August 11, 1932, Serial No. 628,405

1 Claim. (Cl. 298—11)

The present invention relates to vehicles and particularly to trucks for the transportation of commodities, either in bulk form, such as coal, gravel, sand, or the like, or in the form of packages.

One object of the invention is to provide a vehicle of this type which may be operated either as a dump truck or as a simple non-dumping truck, having means, however, adapted to be called into action at the will of the operator for elevating the vehicle body or goods container to any one of a number of predetermined positions above the chassis to facilitate discharge of goods therefrom but without tilting or inclining such body.

Another object of the invention is to provide a vehicle of the dump truck class, the goods container of which normally rests upon a chassis in a relatively low position but which may be elevated to higher position, means being provided for effecting the dumping operation with the goods container located in any one of the positions to which it may be moved.

The invention further contemplates the provision of a novel body or goods container elevating mechanism of such character that, when the body is actually elevated, it is so moved that its center of gravity is moved forwardly of the vehicle instead of rearwardly as is customary, thus increasing the stability of the vehicle as a whole and rendering the auxiliary vehicle rear end supporting mechanisms now commonly used unnecessary.

The invention further contemplates the combination with novel mechanical elevating lever and body supporting means of hydraulic means, independently controllable, for effecting the elevation of the body as desired and effecting the dumping as desired, the said mechanisms being independently operable so that dumping may be effected hydraulically without elevation of the body, elevation may be effected without dumping movement of the body, or elevation and dumping movements of the body may be simultaneously effected.

The invention is susceptible of embodiment in numerous mechanical structures depending upon the type of vehicle to which it is to be applied and the uses to which it is to be put, and one form of the invention is illustrated in the accompanying drawings by way of example. It will be appreciated, however, by one skilled in the art that the design and arrangement of the component elements of the invention may be considerably modified within the spirit and scope thereof.

In the drawings:

Figure 1 is a side elevation of a motor vehicle of the dump truck class with which the invention has been incorporated, the goods container being shown in two of its positions;

Figure 2 is a rear elevation of the same;

Figure 3 is a diagrammatic side elevation of the rear portion of the vehicle, showing the various positions in which the goods container or body may be manipulated; and Figures 4, 5, 6, 7, and 8 illustrate details, these figures being taken respectively on lines 4—4, 5—5, 6—6, 7—7, and 8—8 shown either in Figure 1 or Figure 2.

The chassis of the vehicle is of conventional form and is indicated generally at 10. The body or goods container is indicated at 11 and is of the familiar open-top type with rear dumping gate 12, although the invention is, of course, limited to no particular type of body. The side frame members of the chassis are indicated at 13, 13 respectively, and superposed upon these members and securely fastened thereto as by bolts or rivets are channel members 14, 14. The bottom frame of body 11 is indicated at 15, and this frame may be constructed in any suitable manner, as, for instance, of parallel channel members such as indicated in the drawings. Extending longitudinally of channel members 15 and secured to the under sides thereof by suitable fastening means, and in such position as to be parallel to channel members 14, are angle members 16, 16 respectively. Interposed between channel members 14, 14 and angle members 16, 16 are the operating levers by means of which the truck body may be elevated as shown in the drawings. There are two of these operating or elevating levers on each side of the vehicle, and inasmuch as they are identical in size, formation, and in method of attachment and operation, it is necessary to specifically describe only the levers on one side of the vehicle. These levers are indicated at 18 and 19 respectively and are preferably formed as channel members, substantially straight but oppositely offset at their mid-points so as to cross.

The flanges of one channel are cut away or relieved as shown in Figure 4 so that the webs of both channels are in close parallel relationship and may be conveniently pivoted together by means of a pivot pin such as 20 passing through these webs. The rear end of lever 18 is provided with a roller 21 which is movable in a longitudinally extending confining trackway, the lower confining surface of which comprises the upper surface of the adjacent channel member 14 and the upper confining surface of which comprises the lower surface of a relatively short angle member 23, the vertically extending flange of which is secured to the web of channel member 14. The opposite end of lever 18 is pivotally connected at 24 to a member 25 which is slidably secured within or telescopes with a box-like member 26 secured to the sub-frame of the container or body 11. The rear end of elevating lever 19 is pivoted at 28 to the rear end of angle member 16 secured to the body subframe, and its forward end is pivoted at 30 to the forward end of channel 14.

When in lowermost position, body 11 is supported as shown in full lines in Figure 1 of the drawings, the lateral flanges of elevating levers 18 and 19 lying flat against one another and providing a firm support. This is the normal position of the body, and when it is in such position, the vehicle may be used in the ordinary way for the transportation of goods. Means is provided, however, to effect elevation of the body without dumping, dumping of the body without elevation, or dumping of the body in any position to which it may be elevated. This means is hydraulic in its nature and comprises essentially two hydraulic jacks indicated at 35 and 36 respectively, jack 35 being the elevating jack and jack 36 the dumping jack. These jacks are connected by fluid lines 37 and 38 respectively to a pump which may be conveniently operated by the motor vehicle engine under the control of the operator, control valves in these lines being indicated diagrammatically at 37' and 38' and these valves being preferably located so that they may be conveniently reached by the operator of the vehicle while seated in the cab, at any time. The plunger of jack 35 is connected to pivot pins 20. In fact pins 20 may be interconnected as shown in Figure 7 so as to form one continuous U-shaped member. The movable member 35' of jack 35 is connected to this cross piece as shown in Figure 7.

When valve 37' is opened to admit fluid under pressure to jack 35, the movable member of the jack exerts pressure upon the cross piece just described, this pressure being equally conveyed to pivot pins 20 and serving to elevate these pins to desired position, for instance, to the position shown in dotted lines in Figure 1. During such movement roller 21 rolls forwardly in its trackway, and member 25 slides rearwardly or telescopes with member 26. As a result, the body 11 is lifted but at the same time is moved forwardly of the vehicle, thus shifting the center of gravity of the vehicle forwardly and eliminating any danger of rearward overturning which is constantly present in those types of vehicles in which elevation of the goods container or body is accompanied by rearward movement thereof.

The dumping jack 36, being under the independent control of the operator, may be energized at any time. The movable member of jack 36, indicated at 36', is pivotally connected to one of the channel members forming the under-frame of the body 11, and the outer casing of this jack is pivotally hung from members 26 by the supporting arms 40. Energization of the jack 36, therefore, effects tilting movement of the body 11 about pivot pins 28, and this movement may be continued until the necessary inclination of the body for proper dumping is obtained. The fluid line 38 connecting the pump to jack 36 is provided with the necessary conventional flexible sections or flexible joints so that this connection is not broken as the body is elevated or lowered.

In the appended claim the body supporting means, to which the body is pivotally connected, is designated a dumping body sub-structure, and the means to which the lower ends of the elevating levers are connected is designated the elevating hoist sub-structure. It will be appreciated that the two sub-structures thus defined may vary considerably in detail without departure from the invention and that the exact nature of the connections between the sub-structure and elevating levers may be modified while at the same time the advantages of the invention are retained.

Having thus described the invention, what is claimed as new and desired to be secured by Letters Patent is:

In a vehicle of the type described, in combination, a chassis having an engine mounted thereon at its forward end and road wheels supporting the same, an elevating hoist sub-structure mounted on the chassis, a dumping body sub-structure, a dumping body mounted upon and pivotally connected to said last mentioned sub-structure, mechanism for elevating the body sub-structure to any one of a number of possible positions above the chassis while maintaining the same substantially horizontal, said means including two crossed elevating levers pivotally connected intermediate their ends, one of said levers having its forward end pivotally connected to the elevating hoist sub-structure and its rear end pivotally connected to the body sub-structure, the second lever having its ends connected to the same sub-structures for movements fore and aft of the same, respectively, means for tilting the body relatively to the body sub-structure, and means for acting upon the elevating levers to rock the same relatively to each other about their common pivotal axis and to thereby effect change in elevation of the body relatively to the chassis.

JAMES A. WATSON, Jr.